United States Patent [19]
Ladd

[11] Patent Number: 6,003,955
[45] Date of Patent: Dec. 21, 1999

[54] HUBCAP RETAINING BRACKETS

[75] Inventor: Anthony A. Ladd, Rte. 4 Box 117-B, Pikeville, Tenn. 37367

[73] Assignee: Anthony A. Ladd, Pikeville, Tenn.

[21] Appl. No.: 09/075,142

[22] Filed: May 8, 1998

[51] Int. Cl.[6] ............................................. B60B 7/06
[52] U.S. Cl. ................................ 301/37.34; 301/37.37; 301/108.4
[58] Field of Search ....................... 301/37.1, 37.31, 301/37.34, 37.37, 108.1, 108.4

[56] References Cited

U.S. PATENT DOCUMENTS

| | | | |
|---|---|---|---|
| 2,198,057 | 4/1940 | Lyon | 301/37.31 |
| 2,231,183 | 2/1941 | Flanders | 301/37.31 X |
| 2,267,588 | 12/1941 | Eksergian et al. | 301/37.31 X |
| 2,281,153 | 4/1942 | Horn | 301/37.31 |
| 2,448,536 | 9/1948 | Lyon | 301/37.31 |
| 2,460,784 | 2/1949 | Lyon | 301/37.37 |
| 5,676,430 | 10/1997 | Wright et al. | 301/37.37 X |

*Primary Examiner*—Russell D. Stormer

[57] ABSTRACT

Brackets by which the wheels of an automobile, truck, or other motor vehicle can be adapted to retain hubcaps designed for a motor vehicle wheel with a different size or style of wheels. In the preferred embodiment there is a first bracket with two tabs at opposite ends, and a second bracket with only one tab at one end. The tabs project radially outward at an angle from each other. The three equidistant tabs fit inside the rim of a hubcap to retain it on the wheel. The brackets are rubber coated, so that the brackets will not damage the surface of the wheels of a motor vehicle, as by scraping off the paint. There are large holes in the middle of each bracket to allow adequate access to the lug nuts by which the wheel is fastened onto the axle.

13 Claims, 3 Drawing Sheets

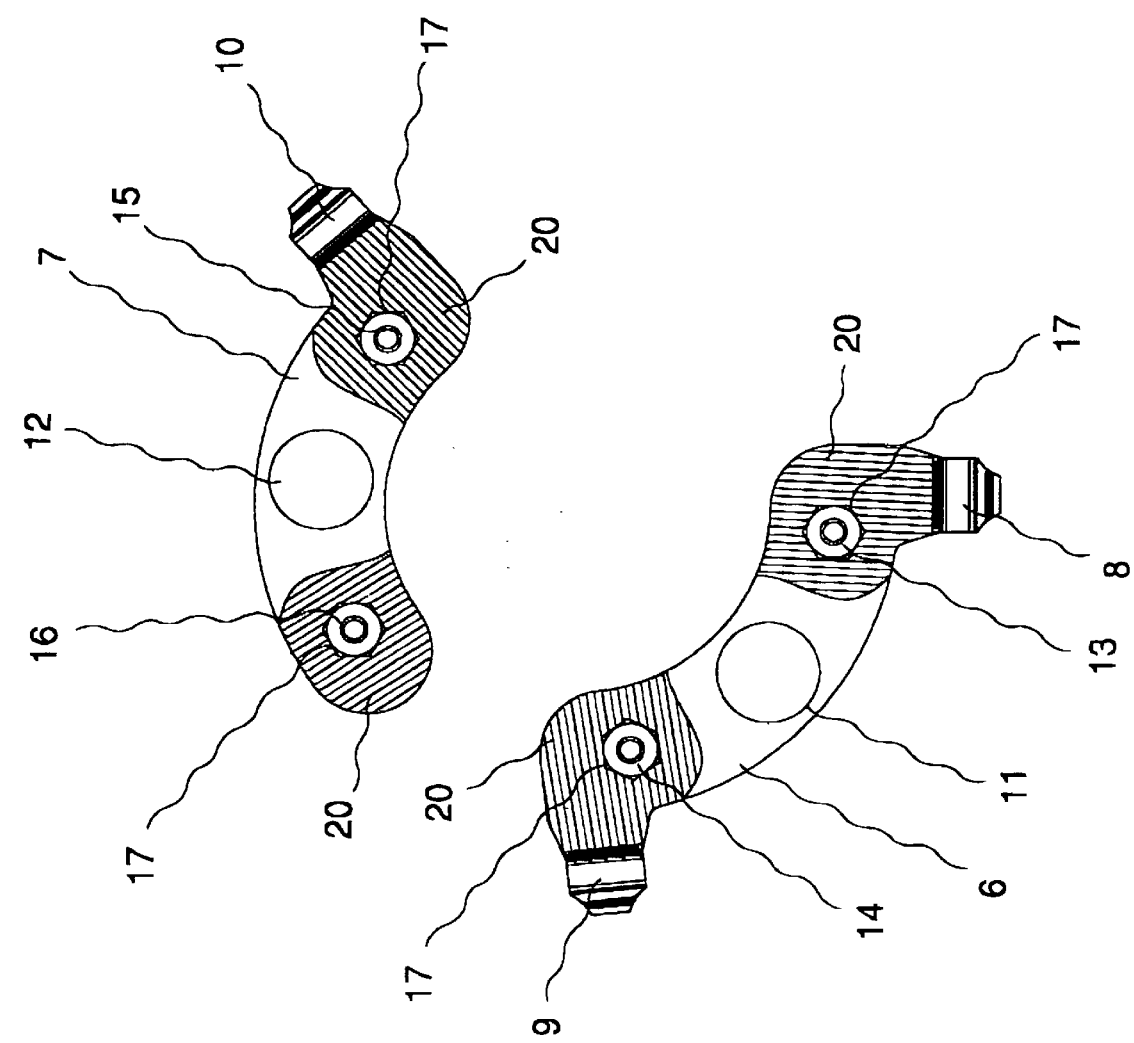

HUBCAP RETAINING BRACKETS

FIELD OF THE INVENTION

The present invention relates to retaining hubcaps of different sizes or styles to motor vehicle wheels of different sizes or styles.

BACKGROUND OF INVENTION

There has always been a problem transferring hubcaps of different sizes or styles to wheels of different sizes or styles. The present invention includes a pair of brackets by which a hubcap may be retained to wheels of different sizes or styles.

U.S. Pat. No. 2,193,106, issued on Mar. 12, 1940, to George Albert Lyon, discloses ornamental member fastening means, using spring clips, which are distinguishable from the rigid brackets of the present invention.

U.S. Pat. No. 2,298,669, issued on Oct. 13, 1942, to Edward L. Wood, discloses a wheel trim securing means, using a plurality of circumferentially radially resilient retainer springs, which are distinguishable from the rigid brackets of the present invention.

U.S. Pat. No. 2,386,231, issued on Apr. 23, 1943, to George Albert Lyon, discloses a wheel structure, for retaining an ornamental cover, i.e., a hubcap, with resiliently flexible cover members, which are distinguishable from the rigid brackets of the present invention.

U.S. Pat. No. 2,818,304, issued on Dec. 31, 1957, to Harry J. Horn, discloses a vehicle wheel cover, with spring clips for connecting the cover to the wheel, which are distinguishable form the rigid brackets of the present invention.

U.S. Pat. No. 4,470,638, issued on Sep. 11, 1984, to Thomas Bartylla, discloses a hubcap attachment, with a circular belt adjustable around an axle hub, which is distinguishable from the brackets of the present invention.

U.S. Pat. No. 4,725,100, issued on Feb. 16, 1988, to Anthony J. Patti, discloses a vehicle wheel cover assembly and attachment, which the hubcap attached to a wheel cover disc fastened to the wheel using U-shaped clips. The present invention is distinguishable in that is does not require that another disc be attached between the wheel and the hubcap, and its brackets are shaped differently from the U-shaped clips.

U.S. Pat. No. 4,895,414, issued on Jan. 23, 1990, to Alvin R. Fleming and John Chiodo, discloses a wheel cover attachment assembly, with the engagement clip members that are attached to a hubcap, and the detent members that fit within the clip members and hold the hubcap in place by pressing outward against a wheel rim. The present invention is distinguishable in that it is bolted to the wheel, and each bracket has only one piece.

None of the above inventions and patents, taken either singly or in combination, is seen to describe the present invention as claimed.

SUMMARY OF THE INVENTION

The present invention is a pair of brackets, with tabs by which a hubcap is held in place, that are retained to the wheel of a motor vehicle. They can be used to retain a hubcap on a wheel of a different size or style than that for which the hubcap was originally designed. In a preferred embodiment, the brackets can be made of metal or other materials, and coated with an elastic material to prevent damage to the surface of the wheel.

Accordingly, it is a principal object of the invention to provide a means by which hubcaps can be retained on motor vehicle wheels of a different size or style than those for which the hubcaps were originally designed.

It is a futher object of the invention to provide a means by which hubcaps with a unique ornamental appearance can be adapted to other wheels of motor vehicles.

It is a futher object of the invention to provide improved elements and arrangements thereof in an apparatus for the purposes described which is dependable and fully effective in accomplishing its intended purposes.

These and other objects of the present invention will become readily apparent upon further review of the following specification and claims.

BRIEF DESCRIPTION OF THE DRAWINGS

FIG. 3 is an enlarged front elevational view of the invention showing representation of the protective coating.

Similar reference characters denote corresponding features consistently throughout the drawings.

DETAILED DESCRIPTION OF THE PREFERRED EMBODIMENT

The present invention is a pair of brackets by which the wheels of an automobile, truck, or other motor vehicle can be adapted to retain hubcaps designed for a wheel of a different size or style.

Figure 1:
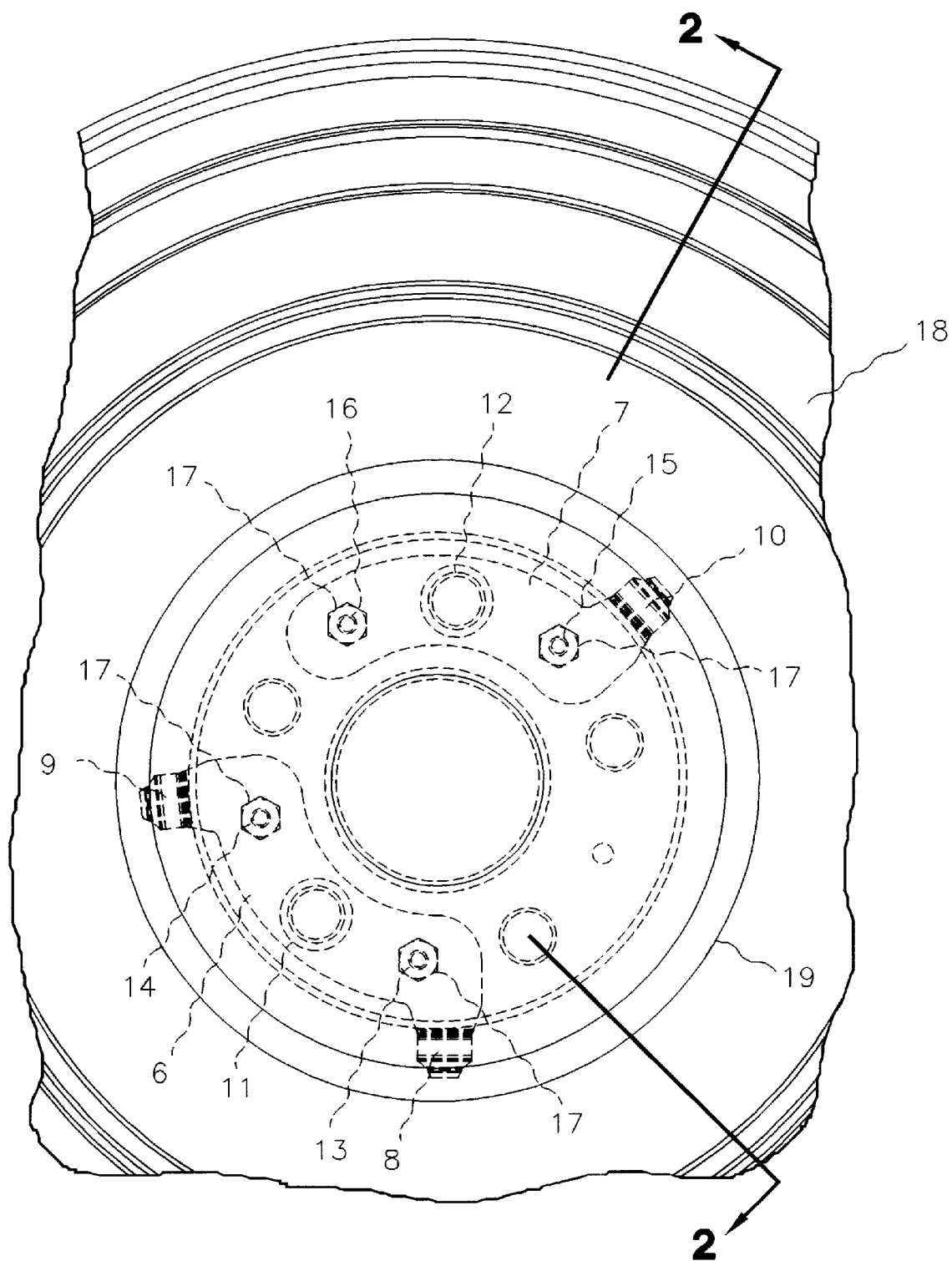
FIG. 1 is a front elevational environmental view of the invention attached to a wheel shown in broken lines.

FIG. 1 shows brackets 6 and 7 fastened to a motor vehicle wheel 18 (which is not part of the claimed invention). Bracket 6 has two tabs 8 and 9 at opposite ends; bracket 7 has one tab 10 at one end. It can be seen that the tabs project radially outward at an angle from each other. These three equidistant tabs fit inside the rim of a hubcap to retain it on the wheel. The brackets are coated with an elastic material to avoid damage to the surface of the wheel. There are large holes 11 and 12 in the middle of each bracket to allow adequate access to the lug nuts by which the wheel is fastened onto the axle. Four bolts 17 retain the brackets on the wheel.

Figure 2:
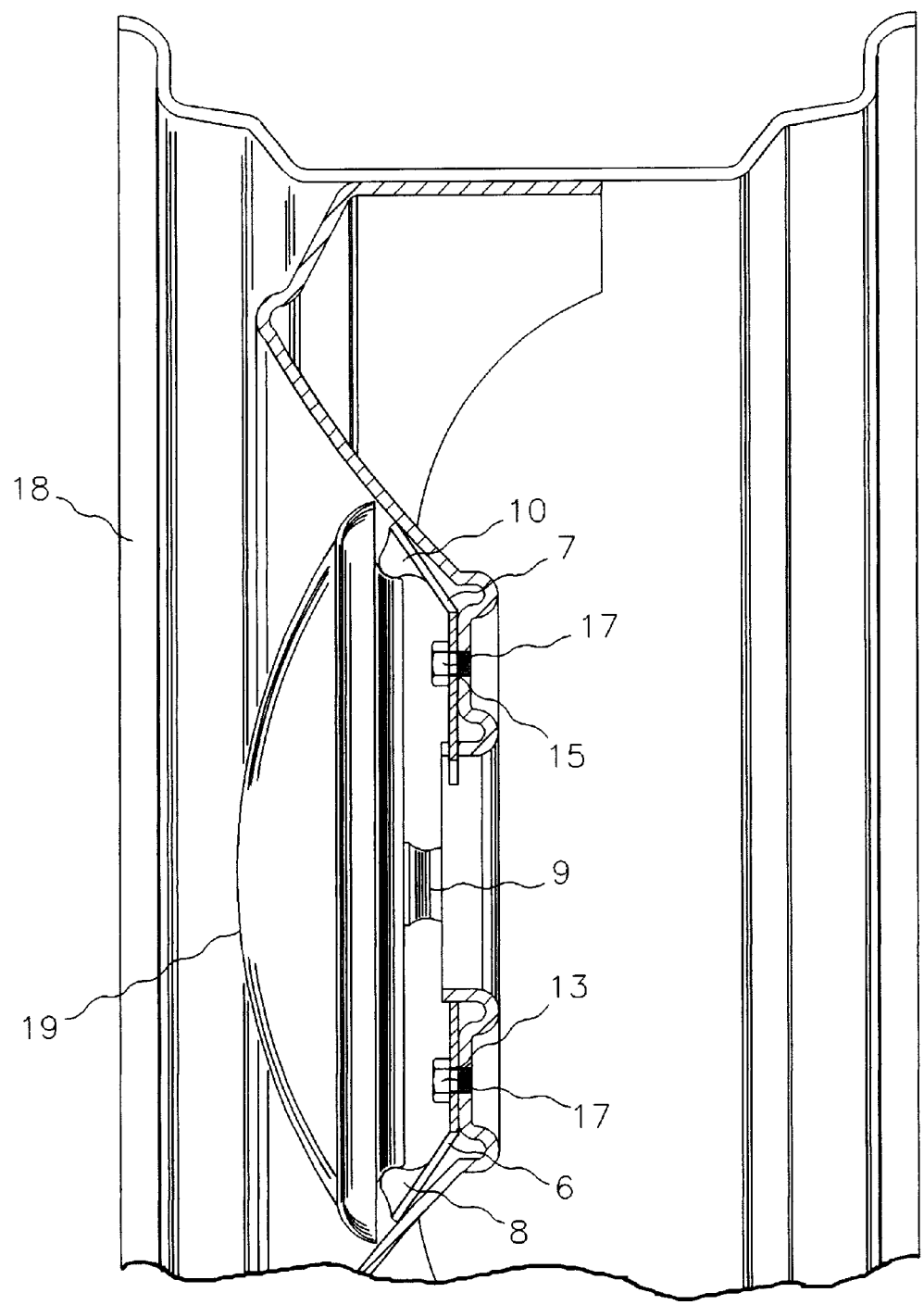
FIG. 2 is a side elevational view of the invention, attached to a motor vehicle wheel in accordance with FIG. 1.

FIG. 2 is a side elevation view showing the brackets 6 and 7, with tabs 8, 9, and 10, fastened to a motor vehicle wheel 18 (which is not part of the claimed invention), while retaining a hubcap 19 (which is not part of the claimed invention). Each bracket has two small holes 13, 14 (shown in FIGS. 1 and 2), 15, and 16 (shown only in FIG. 1), by through which the bolts 17 are inserted to fasten the brackets onto the wheel. In the preferred embodiment the brackets can be made of metal or other materials, with the tabs being bent. The finished brackets are dipped in an elastic coating 20.

Altough this invention has been illustrated and described in connection with particular embodiments thereof, it will be apparent to those skilled in the art, that various changes and modifications may be made therein, without departing from the spirit of the invention or from the scope of the appended claims. Accordingly, the drawings and descriptions will be regarded as illustrative in nature and not as restrictive.

REFRENCE NUMBERS IN DRAWINGS

6. Bracket (having two tabs)
7. Bracket (having one tab)

8. Tab (bracket 6)
9. Tab (bracket 6)
10. Tab (bracket 7)
11. Large hole
12. Large hole
13. Small hole (bracket 6)
14. Small hole (bracket 6)
15. Small hole (bracket 7)
16. Small hole (bracket 7)
17. Bolt (not part of the claimed invention)
18. Wheel (not part of the claimed invention)
19. Hubcap (not part of the claimed invention)
20. Protective Coating

I claim:

1. Hubcap adapting brackets for attaching a hubcap to a vehicle wheel, said hubcap comprising a body and a projection extending toward said wheel and said wheel comprising a plurality of bolts extending outwardly therefrom;

said brackets comprising a plurality of brackets, each bracket including a plurality of holes extending therethrough;

at least one of said holes comprising a large circular hole sized to fit over an existing lug nut of said vehicle wheel, at least another of said holes comprising a smaller hole sized to receive one of said bolts extending from said wheel;

said brackets including at least one tab extending outward therefrom to engage said projection extending from said hubcap, whereby said brackets retain said hubcap to said wheel.

2. The hubcap adapting brackets according to claim 1, wherein the brackets have sides having the form of portions of concentric circles with their centers at the center of the wheel.

3. The hubcap adapting brackets according to claim 1, wherein the means for fastening the brackets onto a wheel are holes in the brackets and bolts that can be inserted through the holes.

4. The hubcap adapting brackets according to claim 1, wherein the tabs are positioned so that the brackets can be fastened onto a wheel in such a manner that the tabs are equidistant.

5. The hubcap adapting brackets according to claim 1, wherein there is a first bracket from which two tabs extend, and a second bracket from which one tab extends.

6. The hubcap adapting brackets according to claim 1, wherein the tabs and portions of the brackets are coated with an protective material.

7. The hubcap adapting brackets according to claim 1, wherein the brackets each have a middle portion and opposite end portions, with a circular hole in each portion.

8. The hubcap adapting brackets according to claim 1, wherein the brackets have flat portions lying in a first plane, the tabs have flat portions lying in a second plane parallel to the first plane, and there are connecting portions joining the tabs to the brackets, with the connection portions lying between the first plane and the second plane.

9. The hubcap adapting brackets according to claim 8, wherein the brackets have sides having the form of portions of concentric circles with their centers at the center of the wheel.

10. The hubcap adapting brackets according to claim 8, wherein the means for fastening the brackets onto a wheel are holes in the brackets and bolts that can be inserted through the holes.

11. The hubcap adapting brackets according to claim 8, wherein the tabs are positioned so that the brackets can be fastened onto a wheel in such a manner that the tabs are equidistant.

12. The hubcap adapting brackets according to claim 8, wherein there is a first bracket from which two tabs extend, and a second bracket from which one tab extends.

13. The hubcap adapting brackets according to claim 3, wherein the circular holes in the end portions are suitably dimensioned so that the bolts by which the brackets are fastened to the wheel can be inserted through them, and the circular holes in the middle portions are larger than the circular holes in the end portions.

* * * * *